(12) United States Patent
Wang et al.

(10) Patent No.: US 11,479,191 B2
(45) Date of Patent: Oct. 25, 2022

(54) SINGLE-SIDED VOLTAGE LEAKAGE DETECTION

(71) Applicant: Ford Global Technologies, LLC, Dearborn, MI (US)

(72) Inventors: Baojin Wang, Saline, MI (US); Chingchi Chen, Ann Arbor, MI (US); Benjamin A. Tabatowski-Bush, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/155,702

(22) Filed: Jan. 22, 2021

(65) Prior Publication Data

US 2022/0234528 A1 Jul. 28, 2022

(51) Int. Cl.
*B60R 16/033* (2006.01)
*H02J 7/00* (2006.01)
*H01M 10/42* (2006.01)

(52) U.S. Cl.
CPC ....... *B60R 16/033* (2013.01); *H01M 10/4257* (2013.01); *H02J 7/0047* (2013.01); *H02J 7/0063* (2013.01); *H02J 7/00712* (2020.01); *H01M 2010/4271* (2013.01); *H01M 2220/20* (2013.01)

(58) Field of Classification Search
CPC ... B60R 16/033; H02J 7/00712; H02J 7/0047; H02J 7/0063; H01M 10/4257; H01M 2010/4271; H01M 2220/20
See application file for complete search history.

(56) References Cited

U.S. PATENT DOCUMENTS

| | | | |
|---|---|---|---|
| 7,592,815 B2 | 9/2009 | Yano | |
| 8,074,627 B2 | 12/2011 | Siddiqui | |
| 2008/0129308 A1* | 6/2008 | Lindsey | G01R 31/52 324/525 |
| 2015/0333378 A1* | 11/2015 | Chang | H01M 10/4228 429/61 |
| 2017/0113553 A1* | 4/2017 | Gale | G01R 31/52 |

FOREIGN PATENT DOCUMENTS

CN 102171578 A 8/2011

* cited by examiner

*Primary Examiner* — Carlos Amaya
(74) *Attorney, Agent, or Firm* — David Kelley; Brooks Kushman, P.C.

(57) ABSTRACT

A vehicle battery system includes a traction battery having positive and negative terminals, and resistive circuitry including a first resistor electrically connected between one of the terminals and a common ground, a switch, and a second resistor that can be selectively electrically connected between the one of the terminals and the first resistor via the switch. The vehicle battery system also includes a controller that opens and closes the switch, and inhibits charge of the traction battery according to changes in voltage across the second resistor due to opening and closing of the switch.

8 Claims, 5 Drawing Sheets

SINGLE-SIDED VOLTAGE LEAKAGE DETECTION

TECHNICAL FIELD

The present disclosure relates to the control of automotive power systems.

BACKGROUND

Voltage leakage detection can be achieved by using a testing module that requires connection with both a positive terminal and a negative terminal of a vehicle battery.

SUMMARY

A vehicle may comprise a traction battery, a battery circuit, and a controller. The traction battery has a positive terminal in electrical communication with a negative terminal via a battery voltage sensor such that the battery voltage sensor is configured to determine a battery voltage reading of the traction battery. The positive terminal is in electrical communication with a common ground via a first vehicle load. The negative terminal is electrical communication with the common ground via a second vehicle load. The circuit is resistively disposed between the common ground and one of the positive terminal and the negative terminal. The circuit has a voltage sensor configured to determine a voltage value of a sensing resistor. The circuit has a an actuatable switch configured to selectively attach and detach an end of an intermittent resistor within circuit such that the circuit has an open resistance value corresponding to the switch being in an open state and a closed resistance value corresponding to the switch being in a closed state. The controller is in communication with both the battery voltage sensor and the voltage sensor. The controller is programmed to determine a first resistance value of the first vehicle load, and a second resistance value of the second vehicle load using the open resistance value and the closed resistance value. The controller is further programmed to, in response to one of the first resistance value and second resistance being lower than a predetermined resistance threshold, inhibit operation of the traction battery.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, a propulsion system may include a vehicle battery. The vehicle battery maybe used to provide torque to a propulsion system within a vehicle. The vehicle battery may be a traction battery. The vehicle battery may be used to store electrical energy. Further, the vehicle battery may be used to convert the stored electrical energy into mechanical energy to propel the vehicle. The vehicle battery may include a plurality of battery cells. In some embodiments, at least two of the battery cells of the plurality of battery cells are in series. In such embodiments, the electrical potential of both of the battery cells may be summed. Alternatively, or additionally, at least two of the battery cells of the plurality of battery cells are in parallel. In such embodiments, the electrical current capacity may be summed. The vehicle battery may have a plurality of sensors. One of the sensors may determine and provide battery parameters to a vehicle controller. In particular, the vehicle battery may include a voltage sensor. The voltage sensor may be in communication with a pair of positive and negative terminals of the vehicle battery. Further, the voltage sensor may be in communication with a pair of positive and negative terminals of a battery cell of a vehicle battery.

The vehicle battery may have a plurality of terminals. In some embodiments, the vehicle battery may have a pair of terminals. In such embodiments, one of the pair of terminals may be a positive terminal. The positive terminal may be a terminal in direct electrical connection with a positive lead of a vehicle battery. The positive terminal may be in direct electrical communication with a positive vehicle load. The positive terminal may be in electrical communication with a common ground bus terminal via the positive vehicle load. The vehicle battery may have a negative terminal. Similar to the positive terminal, the negative terminal may be in direct electrical communication with a negative vehicle load. Also, the negative terminal may be in electrical communication with a common ground via the negative vehicle load. A vehicle battery having a plurality of cells may have a plurality of positive terminals and a plurality of negative terminals. Each of the cells of the plurality of cells may comprise a pair of terminals.

The propulsion system may include a drivetrain. The drivetrain may be in at least one of electrical, magnetic, and mechanical communication with at least one of an internal combustion engine, an electric power source, and a regenerative braking system. In some embodiments, the drivetrain may be in fluid communication with the internal combustion engine. For example, the vehicle may have a torque converter between the drivetrain and the internal combustion engine. Alternatively, the vehicle may have a clutch between the drivetrain and the internal combustion engine.

The propulsion system may include a generator. The generator may be configured to convert mechanical energy into electrical energy. In some embodiments, the generator may be configured to convert mechanical energy from an internal combustion engine into electrical energy for charging a vehicle battery. The generator may also be used to convert mechanical energy from an internal combustion engine into electrical energy for powering a vehicle load. The generator may be configured to output DC electricity.

The propulsion system may include a motor. The motor may be configured to convert electrical energy into mechanical energy. For example, the motor may be configured to receive electrical energy from a vehicle battery to provide mechanical energy to a vehicle drivetrain. The motor may be configured to receive DC electricity.

The propulsion system may include a regenerative braking system. The regenerative braking system may be in mechanical communication with a plurality of vehicle wheels. The regenerative braking system may be used to convert mechanical energy into electrical energy. For example, the regenerative braking system may be used to convert inertia from braking into electrical energy by using in part, a magnet, to reduce the absolute velocity of a vehicle. Changing magnetic flux may produce an electrical current. The regenerative braking system may be configured to provide the electrical current to an electrical component of the vehicle. For example, the regenerative braking system may be in electrical communication with a vehicle battery, such that the regenerative braking system is configured to produce electricity from inertia gathered from the mechanical communication with the vehicle wheels. Electricity gathered from the regenerative braking system may be converted by the converter such that its electrical parameters are suited for either of the high-voltage and low-voltage electrical bus networks. Alternatively, the regenerative braking system may be configured to produce electricity having electrical parameters suited for either of the high-voltage and low-voltage electrical bus networks.

The vehicle may include a power network. The power network may be configured to facilitate the electrical communication between power electronics within a vehicle. The power network may use a plurality of electrical bus networks to facilitate the communication. One of the electrical bus networks may be a high-voltage bus network. The high-voltage bus network may be configured to provide DC electricity to electrical components requiring a high voltage. For example, the high-voltage bus network may be configured to have an electrical potential difference of 500 volts. The high-voltage bus network may be configured to be in direct electrical communication with a vehicle battery. Another of the electrical bus networks may be a low-voltage bus network. The low-voltage bus network may be configured to provide DC electricity to electrical components that require a low voltage. For example, the low-voltage bus network may be configured to have an electrical potential difference of 12 volts. The low-voltage bus network may be in direct electrical communication with a supplementary battery. The power network may have a converter. The converter may be configured to convert electricity of a first set of electrical parameters into a second set of electrical parameters. For example, the converter may be configured to convert electricity at 500 volts into electricity at 12 volts. The power network may include a common ground. The ground may be configured to act as a source of low electrical potential to facilitate the flow of electrical current. In some embodiments, the high-voltage bus network shares a common ground with the low-voltage bus network. Alternatively, the power network may have a plurality of electrical grounds.

The power network may include a plurality of vehicle loads. The plurality of vehicle loads may include a positive vehicle load. The positive vehicle load may be in direct communication with a positive terminal of a vehicle battery. Additionally, the positive vehicle load may be in direct communication with a common ground bus terminal. The positive vehicle load may be configured to have a predetermined resistive value. The predetermined resistive value may be dependent upon a resistance schedule. The predetermined resistance schedule may be defined by a plurality of vehicle electronics. Examples of electronics of the plurality of vehicle electronics include climate control, driving selection, driver torque request, vehicle audio, and other electronics that require electrical energy. The predetermined resistance schedule may provide an expected vehicle load resistance value based in part on the vehicle electronics currently in operation.

The power network may be in selective electrical communication with a traction battery. The power network may comprise a battery relay. The battery relay may be configured to move between an open and closed state. The open state may correspond to partial traction battery disconnection from the power network. The closed state may correspond to a connection of the traction battery to the power network. The power network may be in selective electrical communication with a battery test circuit. Alternatively, or additionally, the power network may define a battery test circuit. The battery test circuit may be attached and removed from the power network via a test relay. Some embodiments may include a plurality of test relays. The battery test circuit may be configured to determine if a vehicle battery parameter is lower than expected. An out of range vehicle battery parameter may be indicative of a shorted or open circuit. For example, the battery test circuit may be configured to determine that a circuit is compromised due to a lower than expected voltage. The battery test circuit may be parallel to one of a plurality of vehicle loads. For example, the battery test circuit may be parallel to a positive vehicle load.

The battery test circuit may include a plurality of test resistors. The test resistors may be used to determine the voltage differentiation of a circuit. The plurality of test resistors may include a sensing resistor, an intermittent resistor, and a constant resistor. The sensing resistor may be configured to be sampled for its voltage differentiation. The testing resistor may be static in the testing circuit. In some embodiments, the battery test circuit may include a plurality of sensing resistors. The intermittent resistor may be configured to be selectively attached and removed from the battery test circuit. The constant resistor may be static in the testing circuit.

In one embodiment of the battery test circuit, a first test resistor may be defined as a sensing resistor. A second test resistor may be defined as an intermittent resistor. The intermittent resistor may be in series with the sensing resistor. A third test resistor may be defined as a constant resistor. The constant resistor may be in series with the testing resistor. Additionally, the constant resistor may be parallel to the constant resistor. In some embodiments, the third resistor may be a second intermittent resistor.

In another embodiment of the battery test circuit, a first resister may be defined as a sensing resistor. A second test resistor may be defined as an intermittent resistor. The intermittent resistor may be parallel to the sensing resistor. A third test resistor may be defined as a constant resistor. The constant resistor may be in series with both the sensing resistor and the intermittent resistor. In some embodiments, the third resistor may be a second intermittent resistor.

In even another embodiment of the battery test circuit, a first resistor may be defined as a sensing resistor. A second test resistor may be defined as an intermittent resistor. The intermittent resistor may be parallel to the sensing resistor. A third resistor may be defined as a constant resistor. The constant resistor may be parallel to both the sensing resistor and the intermittent resistor.

The battery test circuit may include a voltage sensor. The voltage sensor may be configured to determine the voltage differential across a resistor. In some embodiments, the battery test circuit may determine the voltage differential across the sensing differential. The voltage sensor may have a first and second lead. The voltage sensor may be configured to be parallel to the sensing resistor. As such, the voltage sensor may have the first lead in direct electrical communication with a first end of a testing resistor, and the second lead in direct electrical communication with an opposite end of the testing resistor. The voltage sensor may be configured to send a reading indicative of the measured voltage differential to a controller. The battery test circuit may include a plurality of voltage sensors. Each of the voltage sensors of the plurality of voltage sensors may be configured to determine the voltage differential across a corresponding sensing resistor of a plurality of sensing resistors. Additionally or alternatively, the battery test circuit may include a current sensor. The current sensor may be used to one of determine the electric current and the voltage across a resistor. The current sensor may be in series with the sensing resistor. The battery test circuit may include a plurality of current sensors.

The battery test circuit may include a switch. The switch may be configured to receive a command and selectively open and close. The switch may be configured to effectively reduce exposure to electricity of high voltage. The switch may be used to reduce the overall electrical power experienced by a resistor. The switch may be a fast switching switch. The switch may be a photovoltaic MOSFET. As such, the switch may be configured to change between open and closed states upon the detection of an intensity of electromagnetic (EM) waves being greater than a predetermined threshold. The EM waves may be generated by a diode within the switch. The diode may be configured to receive an electrical signal to produce the EM waves. The EM waves may further be detected by a photoelectric element within the switch. In some embodiments, when the switch is closed, an intermittent resistor may be added to the battery test circuit. Additionally, when the switch is open the intermittent resistor may be removed from the battery test circuit. As such, the battery test circuit may have a plurality resistance values. The battery test circuit may have an open resistance value corresponding to the switch being in an open state. The battery test circuit may have a closed resistance value corresponding to the switch being in a closed state. The battery test circuit may include a plurality of switches.

The battery test circuit may include a switch driver. The switch driver may be configured to receive a signal from a controller. The switch driver may be further configured to provide a command to a switch. The switch driver may be configured to provide a command pattern to a switch. The driver may be configured to provide a first pattern to a switch in response to the receipt of a first signal from a controller. Additionally, or alternatively, the switch driver may be configured to provide a second pattern to the switch in response to the receipt of a second signal from a controller. As the battery test circuit may include a plurality of switches, the switch driver may be configured to send commands to each of the switches of the plurality of switches. Alternatively, the battery test circuit may include a plurality of switch drivers.

The vehicle may include a controller. The controller may be in communication with a switch of a test circuit. The controller may be configured to actuate the switch between an open and closed state. The controller may be in communication with a switch driver. The controller may be configured to send a signal to the switch driver to request the switch driver to actuate a switch at a pattern. The controller may be configured to send a plurality of signals to the switch driver. The controller may be programmed to send a first signal to the switch driver indicative of a request to actuate the switch at a first pattern, and programmed to send a second signal to the switch driver indicative of a request to actuate the switch at a second pattern.

The controller may be in communication with a battery voltage sensor. The controller may be configured to receive and store a signal from the voltage sensor indicative of a present battery voltage. The controller may be configured to store a plurality of battery voltage values. The controller may be configured to store battery voltage values that correspond to one of an open and closed state of the switch. The controller may be in communication with a test voltage sensor. As with the battery voltage sensor, the controller may be configured to receive and store a signal from the voltage sensor indicative of a present test resistor voltage. The controller may be configured to store test resistor voltage values that correspond to one of an open and closed state of the switch.

The controller may be configured to determine a first resistance value of a first vehicle load connected between a positive terminal of a traction battery and a second resistance value of a second vehicle load connected between a negative terminal. To determine the first and second resistance values, the controller may compare voltage values of the traction battery and the sensing resistor in an open position, to the voltage values of the traction battery and the sensing resistor in a closed position. The controller may be presented with a first equation with two variables, and a second equation with the two variables. The equations may be as follows:

$$\left(\frac{1}{R_O} + \frac{1}{R_P}\right)^{-1} + R_N = R_{TO} \text{ and } \left(\frac{1}{R_C} + \frac{1}{R_P}\right)^{-1} + R_N = R_{TC}$$

For reference, $R_O$ is the resistance of the battery test circuit corresponding to the switch being in an open state, $R_C$ is the resistance of the battery test circuit corresponding to the switch being in a closed state, $R_P$ is the resistance value of the first vehicle load, $R_N$ is the resistance value of the second vehicle load, $R_{TO}$ is the total resistance value of the battery test circuit, the first vehicle load, and the second vehicle load corresponding to the switch being in an open state, and $R_{TC}$ is the total resistance value of the battery test circuit, the first vehicle load, and the second vehicle load corresponding to the switch being in a closed state. In a battery test circuit having an intermittent resistor parallel to a static resistor and in series with a sensing resistor, the resistance of the battery test circuit corresponding to the switch being in an open state and resistance of the battery test circuit corresponding to the switch being in a closed state may be obtained by the following equations:

$$R_O = R_{ST} + R_S \text{ and } R_C = \left(\frac{1}{R_I} + \frac{1}{R_{ST}}\right)^{-1} + R_S$$

For reference, $R_{ST}$ is the resistance of a static resistor, $R_S$ is the resistance of the sensing resistor, and $R_I$ is the resistance of the intermittent resistor. The controller may employ a Diophantine routine to determine the solution to the variables within the presented equations.

The controller may compare the resulting determined resistance of the first vehicle load and the second vehicle load to a predetermined threshold. If one of the vehicle loads is below a predetermined threshold, this may indicate a voltage leak. The controller may comprise a voltage value schedule. The voltage value schedule may be defined by a plurality of expected voltage values of one of the sensing resistor and the traction battery. The voltage value schedule may be further defined by a plurality of predetermined SOC values. For example, the voltage value schedule may present a predetermined threshold of a lower voltage value when the battery SOC is below 50% capacity. The voltage value schedule may be further defined by a plurality of predetermined battery temperature values. For example, the voltage value schedule may present a predetermined threshold of a lower voltage value when the battery temperature is above a temperature threshold.

In the event a voltage leak is detected, the vehicle may inhibit an operation of the traction battery. The controller may be configured to inhibit operation of a cell within the vehicle battery. The cell may be corresponding to a battery circuit test within the power network. The controller may inhibit operation of the vehicle battery by opening a battery relay connecting the battery to the power network. Similarly, the controller may inhibit operation of the vehicle battery by opening a battery relay connecting a battery cell to the power network.

Figure 1:
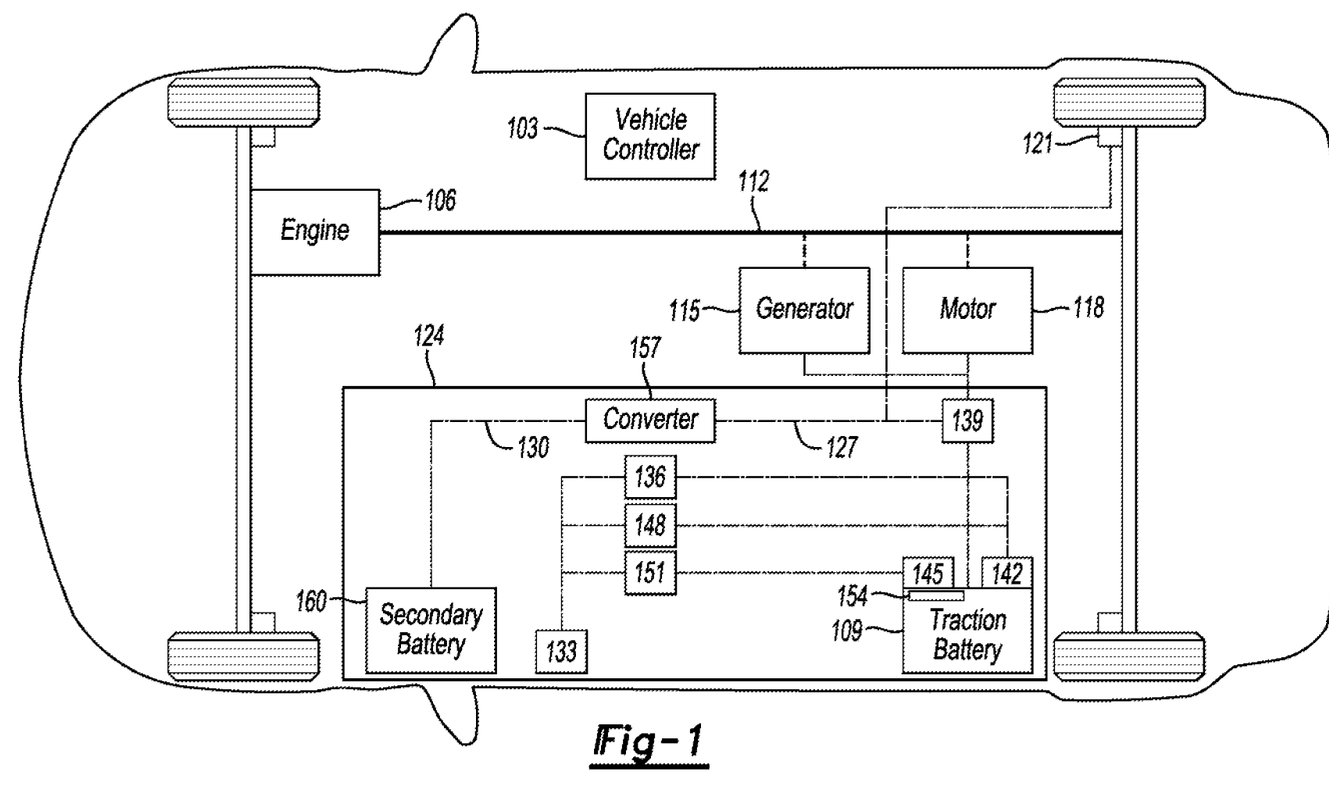
FIG. 1 illustrates a vehicle.

FIG. 1 illustrates a vehicle 100. The vehicle 100 may include a controller 103, an engine 106, a traction battery 109, a drivetrain 112, a generator 115, a motor 118, a regenerative braking system 121, and a power network 124. The engine 106 is configured to propel the vehicle 100. The engine 106 is further configured to provide electricity to the power network 124 via the generator 115. The traction battery 109 is configured to propel the vehicle 100. The traction battery 109 is in electrical communication with the power network 124. The traction battery 109 has a positive terminal 142 and a negative terminal 145. The traction battery 109 has a battery voltage sensor 154 between the positive terminal 142 and negative terminal 145. The battery voltage sensor 154 is configured to determine the voltage of the traction battery 109. The traction battery 109 is configured to provide energy to the drivetrain 112 via the motor 118. The regenerative braking system 121 is configured to convert excess torque into energy. The regenerative braking system 121 is further configured to provide electrical energy to the power network 124. The power network 124 has a high-voltage bus network 127, a low-voltage bus network 130, and a common ground bus terminal 133. The high-voltage bus network 127 and the low-voltage bus network 130 are in electrical communication via a converter. Both the high-voltage bus network 127 and low-voltage bus network 130 are in direct connection with the common ground bus terminal 133. The low-voltage bus network 130 is in direct electrical communication with a secondary battery 160. The positive terminal 142 of the traction battery 109 is in electrical communication with the common ground bus terminal 133 via a positive vehicle load 148. Similarly, the negative terminal 145 of the traction battery 109 is in electrical communication with the common ground bus terminal 133 via a negative vehicle load 151. The traction battery 109 is in electrical communication with a battery test circuit 136. The battery test circuit 136 may be selectively removed from the power network 124 via a test relay 139. The test relay 139 is configured to actuate in response to a command from the controller 103.

Figure 2:
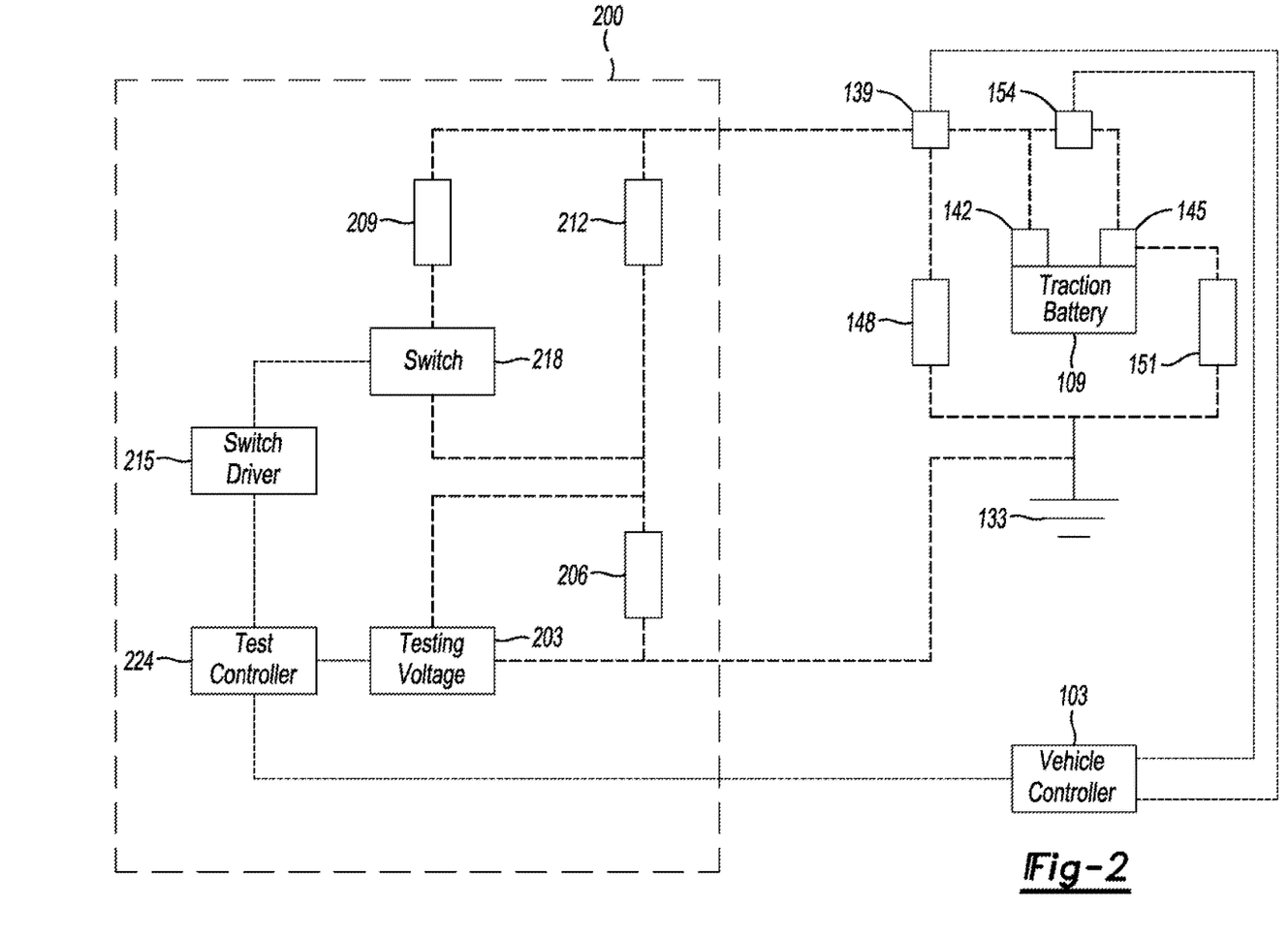
FIG. 2 illustrates a first battery test circuit.

FIG. 2 illustrates a first battery test circuit 200. The first battery test circuit 200 is in electrical communication with the positive terminal 142 and common ground bus terminal 133 of the traction battery 109. The first battery test circuit 200 has a test voltage sensor 203, a sensing resistor 206, an intermittent resistor 209, a static resistor 212, a switch driver 215, and a switch 218. The test voltage sensor 203 is configured to determine the voltage across the sensing resistor 206. The intermittent resistor 209 is configured to be selectively attached to the first battery test circuit 200 corresponding to an open and closed state of the switch 218. The static resistor 212 is disposed parallel to the intermittent resistor 209. The static resistor 212 is disposed in series with the sensing resistor 206. The switch driver 215 is configured to receive a signal from a test controller 224, and send a signal pattern to the switch 218 indicative of an actuation pattern. The test controller 224 is configured to receive a signal from the controller 103 requesting a test initiation.

Figure 3:
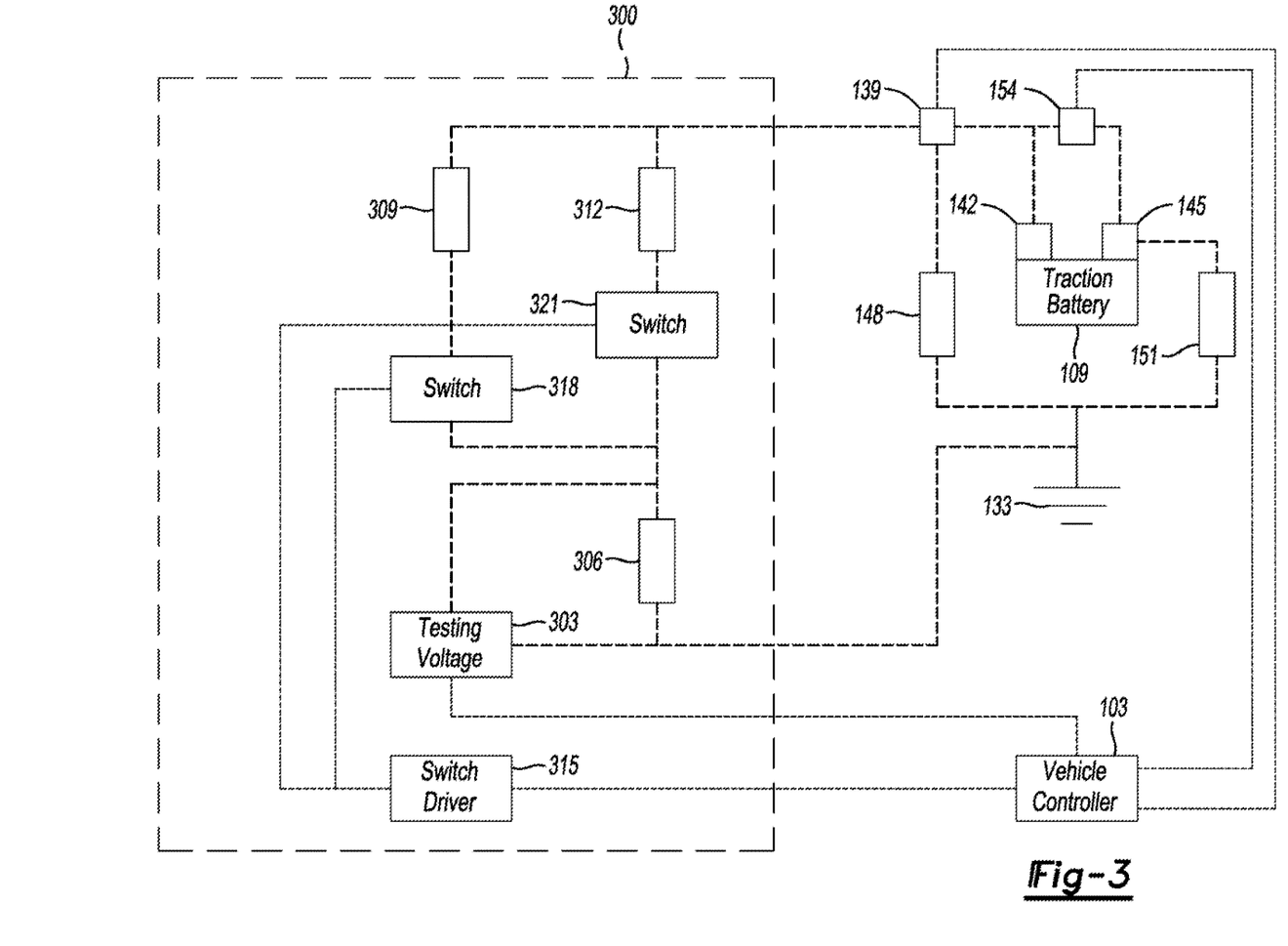
FIG. 3 illustrates a second battery test circuit.

FIG. 3 illustrates a second battery test circuit 300. The second battery test circuit 300 is in electrical communication with the positive terminal 142 and common ground bus terminal 133 of the traction battery 109. The second battery test circuit 300 has a test voltage sensor 303, a sensing resistor 306, a first intermittent resistor 309, a second intermittent resistor 312, a switch driver 315, and a first switch 318. The test voltage sensor 303 is configured to determine the voltage across the sensing resistor 306. The first intermittent resistor 309 is configured to be selectively attached to the second battery test circuit 300 corresponding to an open and closed state of the first switch 318. The second intermittent resistor 312 is disposed parallel to the first intermittent resistor 309. The second intermittent resistor 312 is disposed in series with the sensing resistor 306. The switch driver 315 is configured to receive a signal from the controller 103, and send a signal pattern to the first switch 318 indicative of an actuation pattern.

Figure 4:
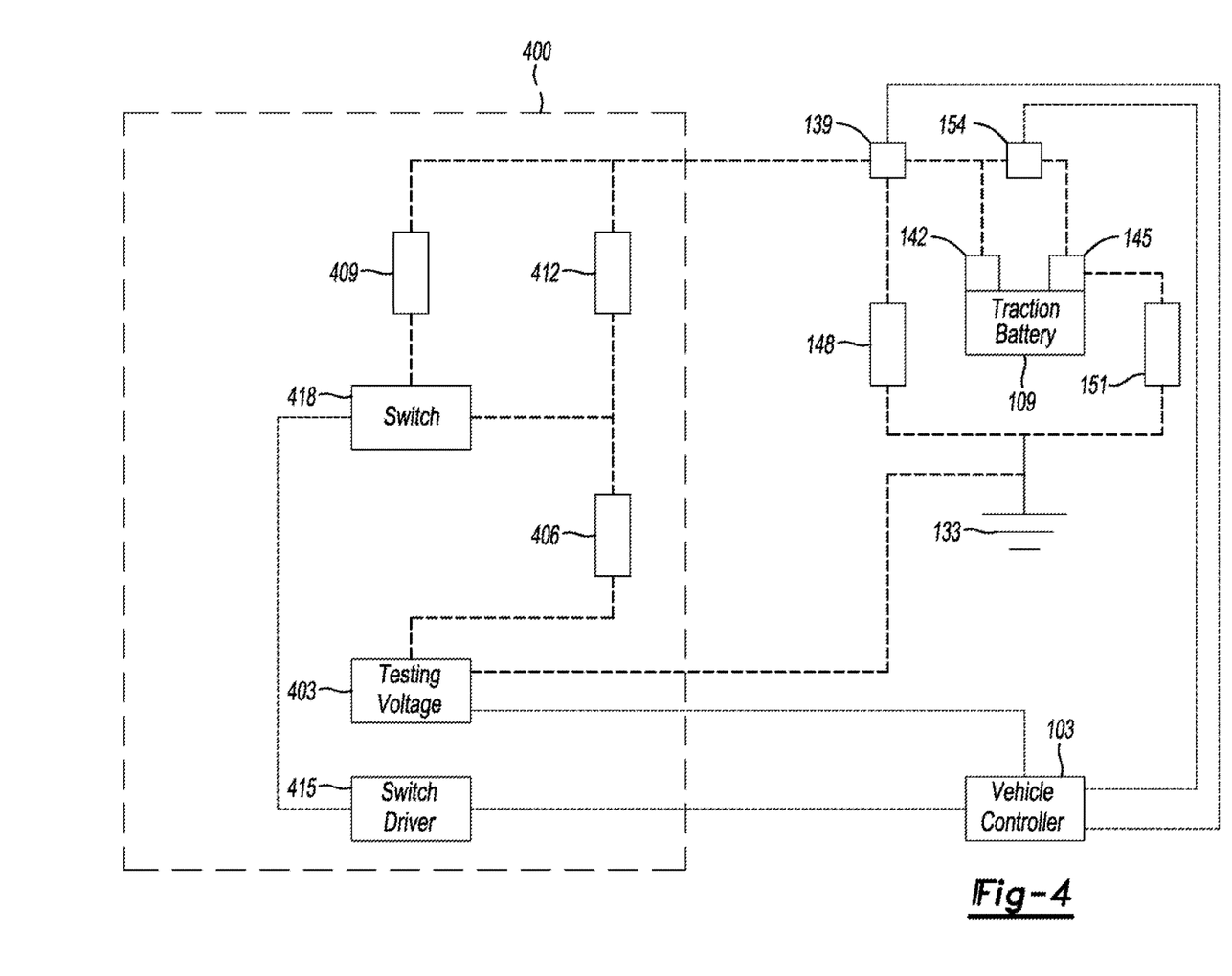
FIG. 4 illustrates a third battery test circuit.

FIG. 4 illustrates a third battery test circuit 400. The third battery test circuit 400 is in electrical communication with the positive terminal 142 and common ground bus terminal 133 of the traction battery 109. The third battery test circuit 400 has a test current sensor 403, a sensing resistor 406, an intermittent resistor 409, a static resistor 412, a switch driver 415, and a first switch 418. The test current sensor 403 is configured to determine the voltage across the sensing resistor 406. The intermittent resistor 409 is configured to be selectively attached to the third battery test circuit 400 corresponding to an open and closed state of the first switch 418. The static resistor 412 is disposed parallel to the intermittent resistor 409. The static resistor 412 is disposed in series with the sensing resistor 406. The switch driver 415 is configured to receive a signal from the controller 103, and send a signal pattern to the first switch 418 indicative of an actuation pattern.

Figure 5:
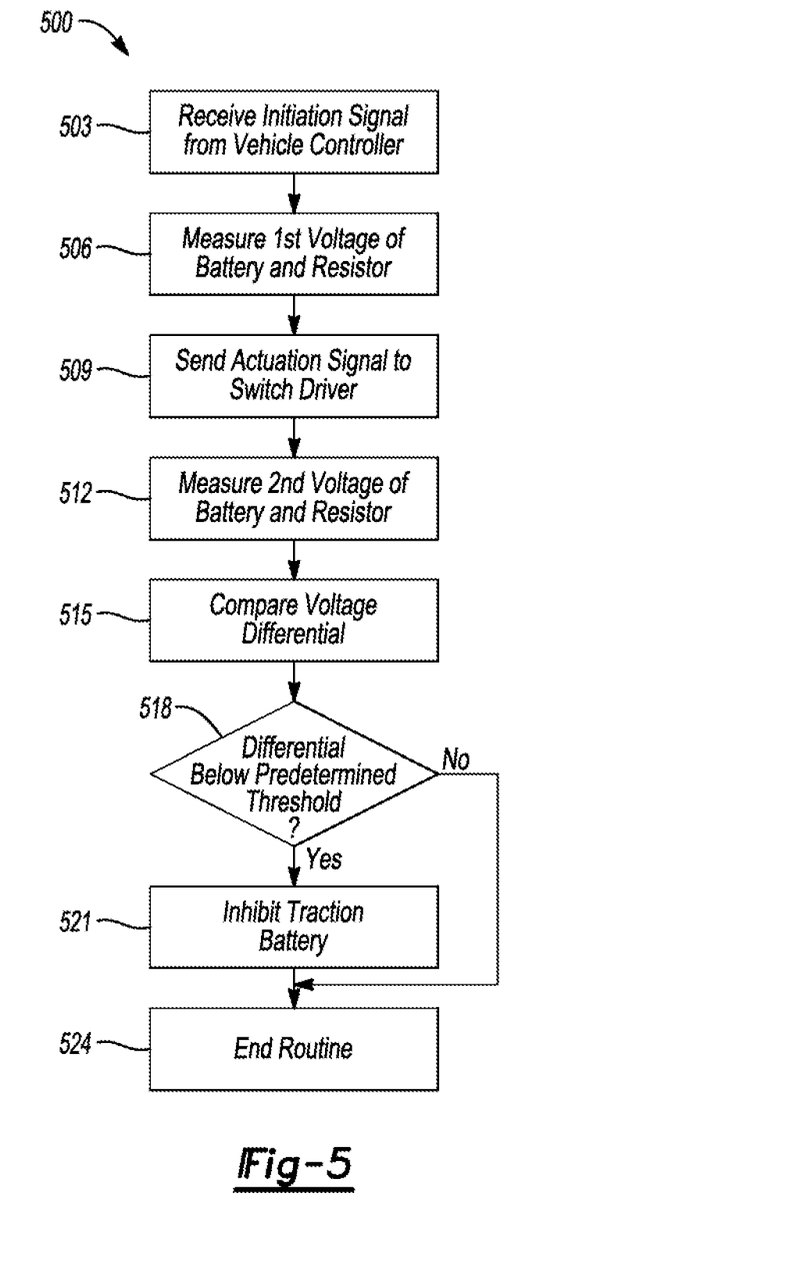
FIG. 5 illustrates a voltage testing algorithm.

FIG. 5 illustrates a first voltage testing algorithm 500. The first voltage testing algorithm 500 begins with a receive initiation signal step 503, in which the controller 103 receives a command to close the test relay 139. Next, the first voltage testing algorithm 500 moves to a measure initial voltage step 506 in which the controller 103 collects the initial voltage values of the traction battery 109 and sensing resistor 206. Next in the send signal step 509, the controller 103 actuates the switch 218 via the switch driver 215 which changes the resistance of the first battery test circuit 200. The first voltage testing algorithm 500 next measures the new voltage of the traction battery 109 and the sensing resistor 206 in the measure intermediate voltage step 512. In the compare voltage differential step 515, the controller 103 derives the resistance of the positive vehicle load 148 and negative vehicle load 151. If they are lower than a predetermined threshold, the controller 103 inhibits the traction battery 109 in the inhibit traction battery step 518. If not, or upon the completion of the inhibit traction battery step 518, the first voltage testing algorithm 500 moves to the end 521 and waits for another signal to test again.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a traction battery including a first voltage sensor connected across a positive terminal and a negative terminal thereof, wherein the positive terminal is in electrical communication with a common ground via a first vehicle load, and the negative terminal is in electrical communication with the common ground via a second vehicle load;
    circuitry connected between the common ground and only one of the positive terminal and negative terminal, wherein the circuitry includes a second voltage sensor configured to sense a voltage value of a sensing resistor, and a switch configured to selectively attach and detach an end of an intermittent resistor within the circuitry such that the circuitry has an open resistance value corresponding to the switch being open and a closed resistance value corresponding to the switch being closed; and
    a controller programmed to selectively inhibit discharge of the traction battery based on the open resistance value and closed resistance value that result from opening and closing the switch.

2. The vehicle of claim 1, wherein the controller is further programmed to inhibit discharge of the traction battery responsive to data derived from the open resistance value and closed resistance value having values less than a threshold.

3. The vehicle of claim 1, wherein the sensing resistor and intermittent resistor are in series.

4. The vehicle of claim 1, wherein the circuitry further includes an additional switch configured to selectively attach and detach an end of an additional intermittent resistor within the circuitry.

5. The vehicle of claim 1, wherein the switch is a photovoltaic transistor.

6. The vehicle of claim 5 further comprising a photovoltaic switch driver configured to actuate the switch according to a first pattern in response to receiving a first signal from the controller.

7. The vehicle of claim 6, wherein the controller is further programmed to send a second signal to the switch driver in response to a state of charge of the traction battery being less than a threshold, and wherein the switch driver is further configured to actuate the switch according to a second pattern in response to receiving the second signal.

8. The vehicle of claim 6, wherein the controller is further programmed to send a second signal to the switch driver in response to a temperature of the traction battery being greater than a threshold, and wherein the switch driver is further configured to actuate the switch according to a second pattern in response to receiving the second signal.

* * * * *